G. E. EVANS.
Evaporating Pan.
No. 44,619.  Patented Oct. 11, 1864.
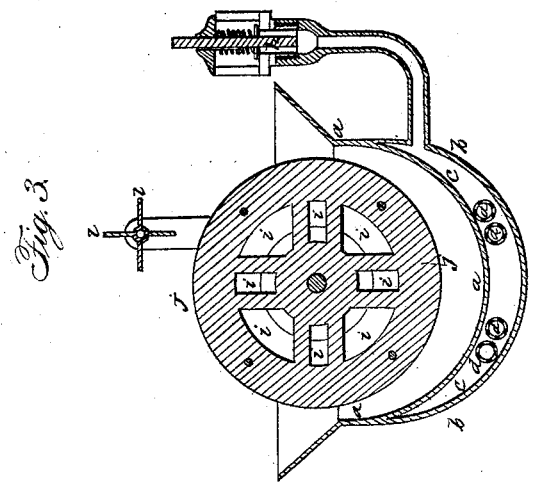
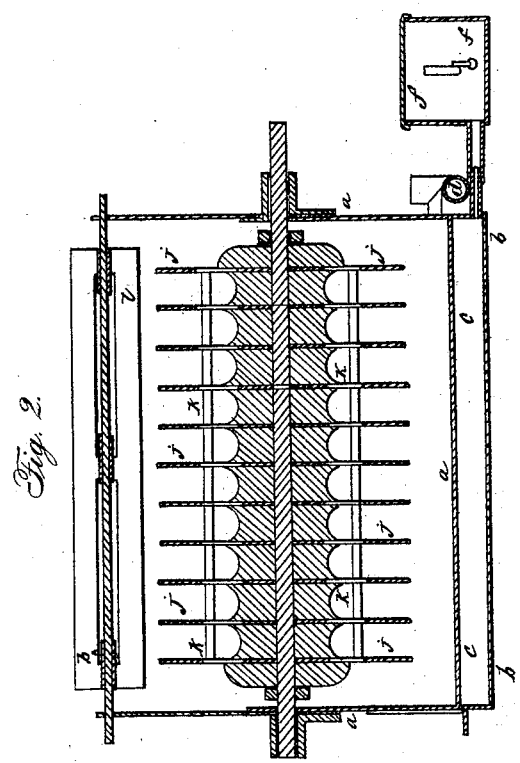
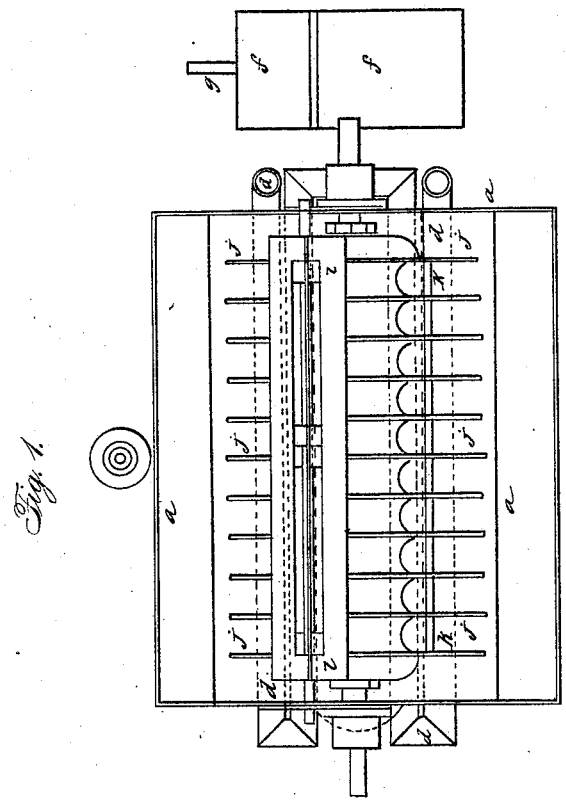
Witnesses:  Inventor:

UNITED STATES PATENT OFFICE.

GEORGE E. EVANS, OF BOSTON, MASSACHUSETTS.

IMPROVEMENT IN APPARATUS FOR EVAPORATING SACCHARINE LIQUIDS.

Specification forming part of Letters Patent No. 44,619, dated October 11, 1864.

*To all whom it may concern:*

Be it known that I, GEORGE E. EVANS, of Boston, in the county of Suffolk and State of Massachusetts, have invented certain new and useful Improvements in Apparatus for Evaporating Saccharine Liquids; and I do hereby declare that the following description, taken in connection with the accompanying drawings, hereinafter referred to, forms a full and exact specification of the same, wherein I have set forth the nature and principles of my said improvements, by which my invention may be distinguished from others of a similar class, together with such parts as I claim and desire to have secured to me by Letters Patent.

In the manufacture and refining of sugar, the evaporating portion of the process should, according to the results of my experiments as developed in the present invention, be effected as follows: First, it is vitally essential that the saccharine liquid should be exposed in every part to a constant and uniform heat, in order to produce not only the best quality of sugar, but the quickest evaporation of the solution; secondly, as great a volume of atmosphere should be brought in contact with the vapor arising from the heated liquid as possible.

No apparatus for evaporating saccharine solutions in which steam heat has been used has heretofore been devised in which every portion of the liquid has been subjected to the same degree of heat, and I have demonstrated by the practical working of my invention that without this condition being fulfilled the purest and whitest of sugar cannot be produced, nor the evaporation be rapidly effected. Taking these two essentials—viz., heating all portions of the liquid to be evaporated alike, and subjecting the heated vapors constantly to circulating currents of air as the groundwork of my improvements—I have constructed my apparatus as follows: First, the vessel containing the saccharine liquid is heated by means of steam delivered from perforated pipes extending under the entire surface or length of the vessel; second, in lieu of the rotating disks consisting of a series of continuous plates, ordinarily employed in this kind of apparatus, I use perforated or skeleton disks, so as to permit a free circulation of air longitudinally through them, which thus comes in contact with the heated vapors arising from the liquid adhering to them as they emerge from the same; third, directly over the disks I employ a revolving fan, which keeps up constant currents of air in contact with the heated vapors that are arising.

My improved evaporator is represented in the accompanying drawings, of which Figure 1 is a plan or top view, Fig. 2 a central longitudinal vertical section, and Fig. 3 a central transverse vertical section, of the same.

$a\ a\ a$ in the drawings represent the receptacle or vessel for containing the saccharine liquid to be evaporated. Under the bottom of this vessel is a casing, $b\ b$, so arranged as to form between it and around the bottom of the vessel $a\ a\ a$ a steam-chamber, $c\ c$, in which are inserted continuous perforated steam-pipes $d\ d$, &c. (Shown in section in Fig. 3 and by red lines in Fig. 1.) These perforated pipes may be of any desired number and may be disposed in any suitable manner, the main object being to subject every portion of the bottom of the vessel equally to the action of the steam. The steam, after passing through and pervading the steam-chamber $c\ c$, is received in a steam-trap, $f\ f$, which is so arranged as to permit the condensed steam or water therein to flow off through a pipe, $g$, when it arrives at a certain level, by means of a suitable valve operated by a float, the steam always resting upon the water in the trap $f\ f$.

$h$ is a safety-valve communicating with the steam-chamber $c\ c$, to permit the escape of steam when it exceeds a stated and desired pressure.

$j\ j$, &c., are a series of rotating disks, which are alternately immersed in and emerge from the liquid in the vessel $a\ a\ a$. Each of these disks, instead of being formed of a continuous sheet or plate, has perforations or apertures $i\ i$, &c., formed in it. These perforations or apertures permit a free circulation of air through the whole series of disks, which is a great aid in taking off the ascending vapors.

$k\ k$, &c., are strengthening-braces, which prevent the disks from being warped or bent.

Over the series of revolving disks $j\ j$ is placed a rotating fan, $l\ l$, having any desired number of wings. The purpose of this fan is to bring an additional volume of air in contact with the heated vapors arising from the liquid in the vessel $a\ a$, and its operation will be readily understood without further explanation.

It will be evident that heating the vessel $a\ a$ by means of steam admitted at one point only under the bottom thereof would not accomplish the objects of my invention, as in that case the portion of liquid directly exposed to the action of the steam in this locality would become more heated than other portions more remote therefrom, whereas the object of my improvement is to fill the chamber $c\ c$ instantaneously with steam and always keep it so filled, so that all parts of it shall be uniformly heated at the same moment.

Having thus described my improvements, what I claim as my invention, and desire to have secured to me by Letters Patent, is—

1. The combination of the perforated pipes or their equivalents, for conveying steam equally to all parts of the heating-chamber, with a separate vessel or steam-trap, so arranged and operating as to prevent the presence of water in the said heating-chamber.

2. In combination with rotating disks or plates, a revolving fan or fans operating substantially as described.

GEO. E. EVANS.

Witnesses:
 JOSEPH GAVETT,
 ALBERT W. BROWN.